United States Patent Office 3,169,072
Patented Feb. 9, 1965

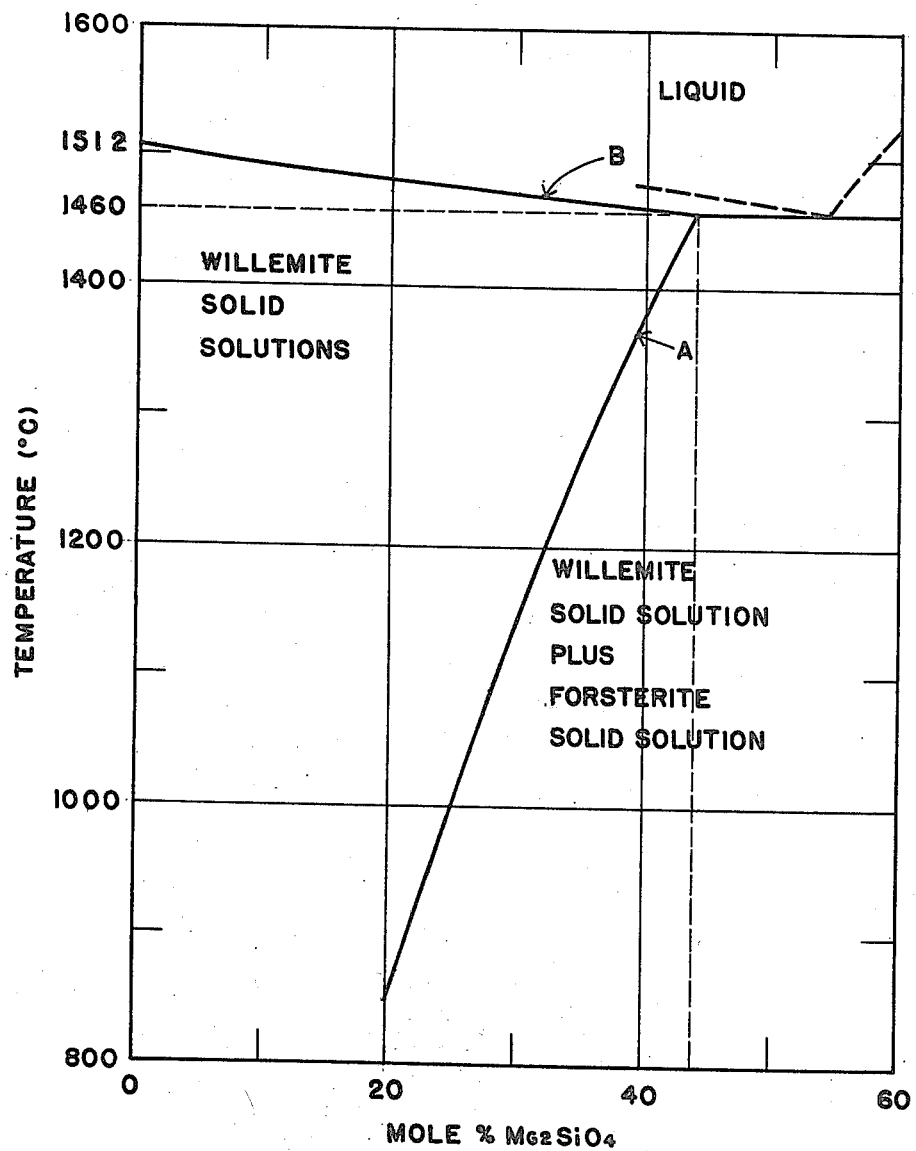

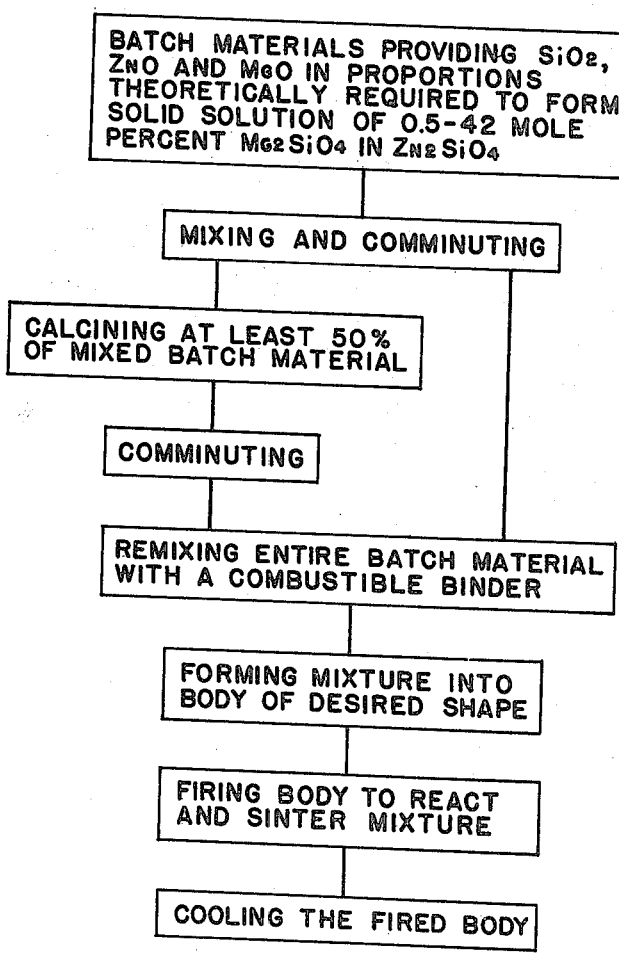

3,169,072
CERAMIC BODIES AND THEIR PRODUCTION
Floyd A. Hummel, State College, Pa., assignor to Corning Glass Works, Corning, N.Y., a corporation of New York
Filed Mar. 20, 1963, Ser. No. 266,579
12 Claims. (Cl. 106—39)

This invention relates to mechanically strong, refractory, low porosity, low expansion, single phase ceramic bodies and the method for their production. More particularly, this invention relates to the production of ceramic bodies with the foregoing characteristics and consisting essentially of a single phase willemite solid solution of $Mg_2SiO_4$ in $Zn_2SiO_4$.

During the past decade, considerable need has developed for strong, refractory, low expansion, single phase ceramic bodies. Applications such as vacuum tight envelopes, combustion chambers, firing trays and aircraft parts need materials with the properties mentioned above. Often, difficulties of fabrication limit the use of these materials.

It is an object of this invention to provide mechanically strong, refractory, low porosity, low expansion, substantially wholly single phase willemite solid solution ceramic bodies.

It is another object of this invention to provide a relatively simple and easy process of fabricating the aforementioned bodies.

It is still another object of this invention to provide ceramic bodies of the aforementioned type that are substantially non-porous.

Other objects and advantages of the present invention will become apparent, to those skilled in the art, from the following detailed description in conjunction with the attached drawing.

FIGURE 1 is a partial phase diagram of the system $Zn_2SiO_4$—$Mg_2SiO_4$.

FIGURE 2 is a schematic flow diagram of the process according to the present invention.

Referring now to FIGURE 1, it can be seen that single phase willemite solid solutions can be formed when magnesium orthosilicate ($Mg_2SiO_4$) does not exceed about 44 mole percent. However, as a practical matter, it is difficult to produce single phase bodies according to the process of the invention when the magnesium orthosilicate content closely approaches the 44 mole percent limit; therefore, it is generally desirable to keep the maximum limit for magnesium orthosilicate down to about 42 mole percent.

Substantially non-porous bodies can be produced with the magnesium orthosilicate content maintained in the range of about 30 to 42 mole percent. When the magnesium orthosilicate content is lower than about 30 mole percent, small amounts of porosity are found in the bodies and the amount of porosity tends to increase as the magnesium orthosilicate content is decreased. Where extremely low porosity is not essential, the magnesium orthosilicate can be as low as about 0.5 mole percent with the balance being substantially all zinc orthosilicate ($Zn_2SiO_4$) and still provide a strong, refractory, low expansion, single phase body.

The magnesium orthosilicate content in bodies of the present invention provide an important inhibiting effect on the volatilization of ZnO from the zinc orthosilicate in the body during firing and during later elevated temperature service. Bodies made essentially wholly of zinc orthosilicate lose ZnO by volatilization with the consequent formation of uncombined silica in the bodies. This free silica greatly tends to form a glassy phase in the bodies thereby adversely affecting the desired properties, e.g., refractoriness and hot strength are substantially reduced. The presence of magnesium orthosilicate in the bodies of the present invention significantly inhibits the volatilization of ZnO therefrom and the adverse effects resulting from such volatilization.

The method of producing bodies according to this invention utilizes common, readily available raw materials that are reacted at elevated temperatures to form essentially single phase willemite solid solutions. Thus, commercially available materials that will provide the basic oxidic constituents of $SiO_2$, ZnO and MgO, without producing any substantial impurity content, can be used. Commonly known potter's flint has been found suitable for providing the silica content. The zinc oxide content has been provided by U.S.P. zinc oxide and the magnesia content by C.P. magnesium carbonate.

Referring now to FIGURE 2, the process of the present invention comprises mixing oxidic batch material consisting essentially of $SiO_2$, ZnO and MgO in proportions theoretically required to form a substantially wholly single phase solid solution of about 0.5 to 42 mole percent of $Mg_2SiO_4$ in $Zn_2SiO_4$ upon substantially complete reaction of all the batch material. Preferably, the batch material is mixed in a ball mill to insure a homogeneous and finely divided mixture for proper and complete reaction in the subsequent steps.

It has been found that bodies having the previously stated desired properties cannot be successfully made by forming bodies wholly from unreacted batch material and then firing to completely react the constituents of the batch. The problem arises from the fact that as zinc orthosilicate is formed from ZnO and $SiO_2$, a very considerable volume expansion takes place. The entire reaction of all the batch material is done in one step after the green ceramic body has been formed. This volume expansion accompanying the formation of zinc orthosilicate causes structural disruptions, cracking, lower density, higher porosity and low strength. In order to overcome this problem, at least about 50%, by weight, of the batch mixture has to be at least partially pre-reacted by calcining at a temperature at least sufficient to form the zinc orthosilicate. Preferably the calcining temperature is not high enough to cause any substantial sintering. A temperature range of about between 1000° and 1300° C. is suitable. When desired or economically practical, the entire batch mixture can be pre-reacted; however, it is preferred to pre-react only about two-thirds of the batch mixture for optimum results.

After the calcining step, the pre-reacted material is comminuted to a finely divided state comparable to that of the unreacted batch mixture, which should be about minus 44 mesh (Tyler). Then the entire batch mixture is remixed together with a combustible binder and formed into a green ceramic body of desired shape by any suitable means, e.g., by pressing, extrusion, etc. Compacting shaped bodies by pressing the binder-containing batch material has been found suitable and quite economical for most shapes and sizes. Batch mixtures for pressing should contain a combustible binder content of at least about 3%, but not in excess of about 15%, by weight of the whole remixed batch material. Any suitable material commonly used in the ceramic art as a combustible binder can be used, e.g., a solution of Carbowax #4000 or #6000 which are waxy polyethylene glycols having molecular weights of about 4000 and 6000, respectively, sold by the Union Carbide Corporation and are water soluble as well as soluble in a wide range of organic solvents.

The green ceramic body is fired to a temperature of not less than about 1300° C. but sufficient to substantially completely react all the batch ingredients to form an essentially single phase solid solution of $Mg_2SiO_4$ in $Zn_2SiO_4$ without causing any melting of the batch material and for a time of at least about one-half hour but sufficient to provide a mechanically strong, low porosity body. It will be apparent from FIGURE 1 that, for bodies having an analytical composition that will provide more than about 37 mole percent $Mg_2SiO_4$, the firing temperature will also have to be no lower than line A. Of course, firing temperatures somewhat higher than line B of FIGURE 1 will lead to detrimental incipient melting. While the phase diagram shown in FIGURE 1 appears to indicate that many compositions of this invention will form a two phase mixture of willemite solid solution and forsterite solid solution upon cooling to room temperature, it has been found that even with fairly slow cooling rates (as by cooling down with the furnace) no second phase forsterite solid solution is found to appear in bodies made according to this invention. Apparently the transformation is extremely sluggish.

It should be noted that, in proportioning the batch ingredients and in firing the green ceramic bodies, care should be taken to avoid free or uncombined silica in the final product because it produces substantially the same detriment as in the wholly zinc orthosilicate bodies previously mentioned. Small amounts of impurities, or second phase, such as magnesium metasilicate ($MgSiO_3$), unreacted magnesia and/or zinc oxide, can be tolerated without too much adverse effect, but generally, the impurities should not exceed 2 mole percent. In many cases, small amounts of unreacted magnesia and/or zinc oxide are unavoidable in order to assure the absence of free or unreacted silica.

The following example is given to better illustrate the invention.

A batch material mixture was made up as follows:

| Oxide | Source | Wt. percent | Mole percent |
|---|---|---|---|
| $SiO_2$ | Potter's flint | 30.94 | 33.33 |
| $ZnO$ | U.S.P. zinc oxide | 54.52 | 43.33 |
| $MgO$ | C.P. basic $MgCO_3$ | 14.54 | 23.33 |

A three kilogram quantity of the above batch was milled as a thick aqueous slip for 24 hours in a ball mill. After drying at 110° C., one-half of the material was calcined at 1260° C. for 2 hours and ground to minus 60 mesh (Tyler). Remixed batches were made up in 100 gram samples in which the calcined material constituted two-thirds of the ceramic material and the uncalcined material constituted the remaining one-third portion. Ten grams of a binder solution consisting of (by weight) 0.6% methylcellulose (i.e., dimethyl ether of cellulose), 33.1% Carbowax #4000 and 66.3% water was thoroughly mixed into each of the 100 gram samples with a mortar and pestle. This mixture was then nodulized by passing it through a 20 mesh (Tyler) screen. The nodulized samples were then pressed into bars (approximately 0.5 cm. x 1 cm. x 8 cm.) in a steel mold under a pressure of 600 p.s.i. After the green bars were removed from the mold, they were heated at a rate of 90° C. per hour to 1425° C., held for 2 hours at 1425° C., and then furnace cooled. The cooled bars exhibited a single phase solid solution of about 35 mole percent of $Mg_2SiO_4$ in 65 mole percent of $Zn_2SiO_4$. Apparent porosity measurements of the bars (made according to A.S.T.M. Designation C373-55T, 1955 Book of A.S.T.M. Standards, Part 3, pp. 818-20) showed values of less than 0.1%. This non-porous characteristic was further confirmed by electron microscopy and by water absorption test values of 0.0%.

Modulus of rupture (sometimes called transverse strength) and Young's modulus values were determined in the manner previously described in a paper by Bush and Hummel: Journal of the American Ceramic Society, vol. 41 (1958), No. 6, pages 189-195. Modulus of rupture values were determined on each of ten bars for each of the following temperatures: 25° C., 200° C., 400° C., 600° C., 800° C., and 1000° C. The average modulus of rupture over the temperature range of 25°-600° C. was substantially constant at a median value of about 7,370 p.s.i. At 800° C., average modulus of rupture was found to be 7,890 p.s.i. and then it dropped off to 6,300 p.s.i. at 1000° C. Young's modulus values were determined on each of three bars for each of the same temperatures at which modulus of rupture values were determined. Over the temperature range of 25°-600° C., the average Young's modulus was about $11.2 \pm 0.5 \times 10^{-6}$ p.s.i. A high average value of about $12.6 \times 10^{-6}$ p.s.i. was obtained at 800° C. and at 1000° C. the average value was slightly less than $6 \times 10^{-6}$ p.s.i.

Thermal expansion data was obtained, by known conventional procedures, for the above example over the temperature range of 25°-1000° C. and the coefficient for this temperature range was determined to be $32 \times 10^{-7}$/° C.

As further illustrations of the invention, other bar specimens were prepared from batch material mixtures made up as follows, in mole percent, from the same raw materials as in the previous example:

| Batch | $SiO_2$ | ZnO | MgO |
|---|---|---|---|
| A2 | 33.33 | 56.67 | 10.00 |
| A3 | 33.33 | 50.00 | 16.67 |
| A4 | 33.33 | 43.33 | 23.33 |

The bars were prepared in the same manner as the previous example except that they were fired at 1300° C. for 3.5 hours. The approximate composition (in mole percent) of the single phase solid solution fired bars and apparent porosity were as follows:

| Bar | $Mg_2SiO_4$ | $Zn_2SiO_4$ | Percent Porosity |
|---|---|---|---|
| A2 | 15 | 85 | 15.7 |
| A3 | 25 | 75 | 6.9 |
| A4 | 35 | 65 | 0.0 |

For comparison purposes, a bar made wholly of potter's flint and U.S.P. zinc oxide in proportions to theoretically yield a single phase of only $Zn_2SiO_4$ was made in the same manner as the latter three of the foregoing examples. Apparent porosity of this bar was 25.9% and it had considerably lower strength than bodies of this invention.

Thus, it can be seen that, by the present invention, there is provided novel low expansion refractory ceramic bodies having good mechanical strength and low porosity. Over the temperature range of 25° to 1000° C., bodies of the present invention are able to withstand rupture loads of at least 4,000 p.s.i. with an apparent porosity of no more than 20% and at least 6,000 p.s.i. with apparent porosity closely approaching zero percent.

Although the present invention has been described with respect to specific details of certain embodiments thereof, it is not intended that such details be limitations upon the scope of the invention except insofar as set forth in the claims.

What is claimed is:

1. As an article of manufacture, a mechanically strong, low porosity, low expansion ceramic body consisting essentially all of a single phase solid solution of $Mg_2SiO_4$ in $Zn_2SiO_4$ wherein the $Mg_2SiO_4$ is analytically present in an amount of about 0.5 to 42 mole percent and the remainder is substantially all $Zn_2SiO_4$.

2. A ceramic body according to claim 1 having a modulus of rupture of at least about 4,000 p.s.i. at temperatures in the range of 25° to 1000° C. and an apparent porosity not in excess of about 20%.

3. As an article of manufacture, a mechanically strong, substantially non-porous, low expansion ceramic body consisting essentially all of a single phase solid solution of $Mg_2SiO_4$ in $Zn_2SiO_4$ wherein the $Mg_2SiO_4$ is analytically present in an amount of about 30 to 42 mole percent and the remainder is substantially all $Zn_2SiO_4$.

4. A ceramic body according to claim 3 having a modulus of rupture of at least about 6,000 p.s.i. at temperatures in the range of 25° to 1000° C. and an apparent porosity of substantially zero percent.

5. The method of forming a mechanically strong, low porosity, low expansion, substantially single phase ceramic body comprising:
  (a) mixing finely divided oxidic batch material consisting essentially of $SiO_2$, $ZnO$ and $MgO$ in proportions theoretically required to form a substantially wholly single phase solid solution of about 0.5 to 42 mole percent $Mg_2SiO_4$ in $Zn_2SiO_4$ upon substantially complete reaction of all the batch material,
  (b) calcining at least about 50%, by weight, of the batch mixture material at a temperature at least sufficient to partially pre-react the mixture to form the $Zn_2SiO_4$,
  (c) comminuting the calcined batch mixture material,
  (d) remixing the entire batch mixture material together with a combustible binder,
  (e) forming the binder-containing batch mixture material into a green ceramic body of desired shape,
  (f) firing the green ceramic body to a temperature of not less than about 1300° C. but sufficient to substantially completely react all the batch material to form the said single phase solid solution without causing any melting of the batch material and for a time of at least about one-half hour but sufficient to provide a mechanically strong, low porosity body.

6. The method according to claim 5 wherein approximately two-thirds of said batch mixture material is calcined.

7. The method according to claim 5 wherein said calcining is done in the temperature range of about 1000° to 1300° C.

8. The method according to claim 5 wherein the firing is done for a time sufficient to provide the said body with a modulus of rupture over the temperature range of 25° to 1000° C. of at least about 4,000 p.s.i. and with an apparent porosity not in excess of about 20%.

9. The method according to claim 5 wherein said finely divided oxidic batch material is mixed in proportions theoretically required to form a substantially wholly single phase solid solution of about 30 to 42 mole percent $Mg_2SiO_4$ in $Zn_2SiO_4$ upon substantially complete reaction of all the batch material.

10. The method according to claim 9 wherein approximately two-thirds of said batch mixture material is calcined.

11. The method according to claim 9 wherein said calcining is done in the temperature range of about 1000° to 1300° C.

12. The method according to claim 9 wherein the firing is done for a time sufficient to provide the said body with a modulus of rupture over the temperature range of 25° to 1000° C. of at least about 6,000 p.s.i. and with an apparent porosity of substantially zero percent.

References Cited in the file of this patent

UNITED STATES PATENTS 2,139,686     Lederle et al. _____ Dec. 13, 1938

FOREIGN PATENTS 384,473     Great Britain _____ Dec. 8, 1932